United States Patent
Beermann et al.

(10) Patent No.: US 7,131,697 B2
(45) Date of Patent: Nov. 7, 2006

(54) SPORTS SEAT FOR A VEHICLE, ESPECIALLY FOR A MOTOR VEHICLE

(75) Inventors: Frank Beermann, Kirchheim/Teck (DE); Friedrich Muellner, Lenningen-Schopfloch (DE)

(73) Assignee: Recaro GmbH & Co., KG, Kirchheim unter Teck (DE)

( * ) Notice: Subject to any disclaimer, the term of this patent is extended or adjusted under 35 U.S.C. 154(b) by 0 days.

(21) Appl. No.: 11/292,969

(22) Filed: Dec. 2, 2005

(65) Prior Publication Data
US 2006/0082208 A1    Apr. 20, 2006

Related U.S. Application Data

(63) Continuation of application No. PCT/EP04/06404, filed on Jun. 15, 2004.

(30) Foreign Application Priority Data
Jun. 20, 2003  (DE) ................ 103 27 639

(51) Int. Cl.
B60N 2/02   (2006.01)
A47C 3/025  (2006.01)
A47C 7/02   (2006.01)

(52) U.S. Cl. .................. 297/354.12; 297/284.9; 297/452.25

(58) Field of Classification Search ............ 297/284.9, 297/411.38, 452.25, 452.18, 451.11, 354.12
See application file for complete search history.

(56) References Cited

U.S. PATENT DOCUMENTS

| | | | |
|---|---|---|---|
| 3,583,762 A | 6/1971 | Strien | |
| 3,951,451 A | 4/1976 | Srock | |
| 4,169,626 A | 10/1979 | Hollar, Jr. | |
| 4,522,445 A | 6/1985 | Göldner et al. | |
| 4,938,529 A * | 7/1990 | Fourrey | 297/284.9 |
| 5,328,236 A * | 7/1994 | Mizushima et al. | 297/284.9 |
| 5,344,215 A | 9/1994 | Dahlbacka | |
| 5,988,757 A * | 11/1999 | Vishey et al. | 297/452.31 |
| 6,039,402 A * | 3/2000 | Nemoto | 297/411.34 |
| 6,332,649 B1 | 12/2001 | Vossmann | |
| 6,550,863 B1 | 4/2003 | Dill et al. | |
| 6,672,666 B1 * | 1/2004 | Stiller et al. | 297/284.2 |
| 6,802,563 B1 | 10/2004 | Mysliwiec et al. | |
| 2003/0116999 A1* | 6/2003 | Fujita et al. | 297/216.13 |
| 2005/0168041 A1* | 8/2005 | Glance et al. | 297/452.18 |

FOREIGN PATENT DOCUMENTS

| | | | |
|---|---|---|---|
| DE | 1 755 333 | 7/1971 | |
| DE | 2 001 842 | 7/1971 | |
| DE | 80 33 029 U1 | 12/1982 | |
| DE | 31 51 018 A1 | 7/1983 | |
| DE | 32 16 060 A1 | 11/1983 | |
| DE | 42 20 471 A1 | 4/1993 | |
| JP | 361215132 * | 9/1986 | 297/284.9 |

* cited by examiner

*Primary Examiner*—Peter M. Cuomo
*Assistant Examiner*—Sarah B. McPartlin
(74) *Attorney, Agent, or Firm*—Womble Carlyle Sandridge & Rice, PLLC

(57) ABSTRACT

In the case of a sports seat (101) for a vehicle, especially for a motor vehicle, having at least one rigid seat shell (103) as a structure for the seat part, and a separately formed, rigid backrest shell (105) as a structure for the backrest, the shells are adjustable in inclination relative to each other, the adjustment of the inclination takes place by way of fittings (107), each of the fittings has a lower part connected fixedly to the seat shell (103), and an upper part which is connected to the backrest shell (105) and can be rotated relative to the lower part.

25 Claims, 3 Drawing Sheets

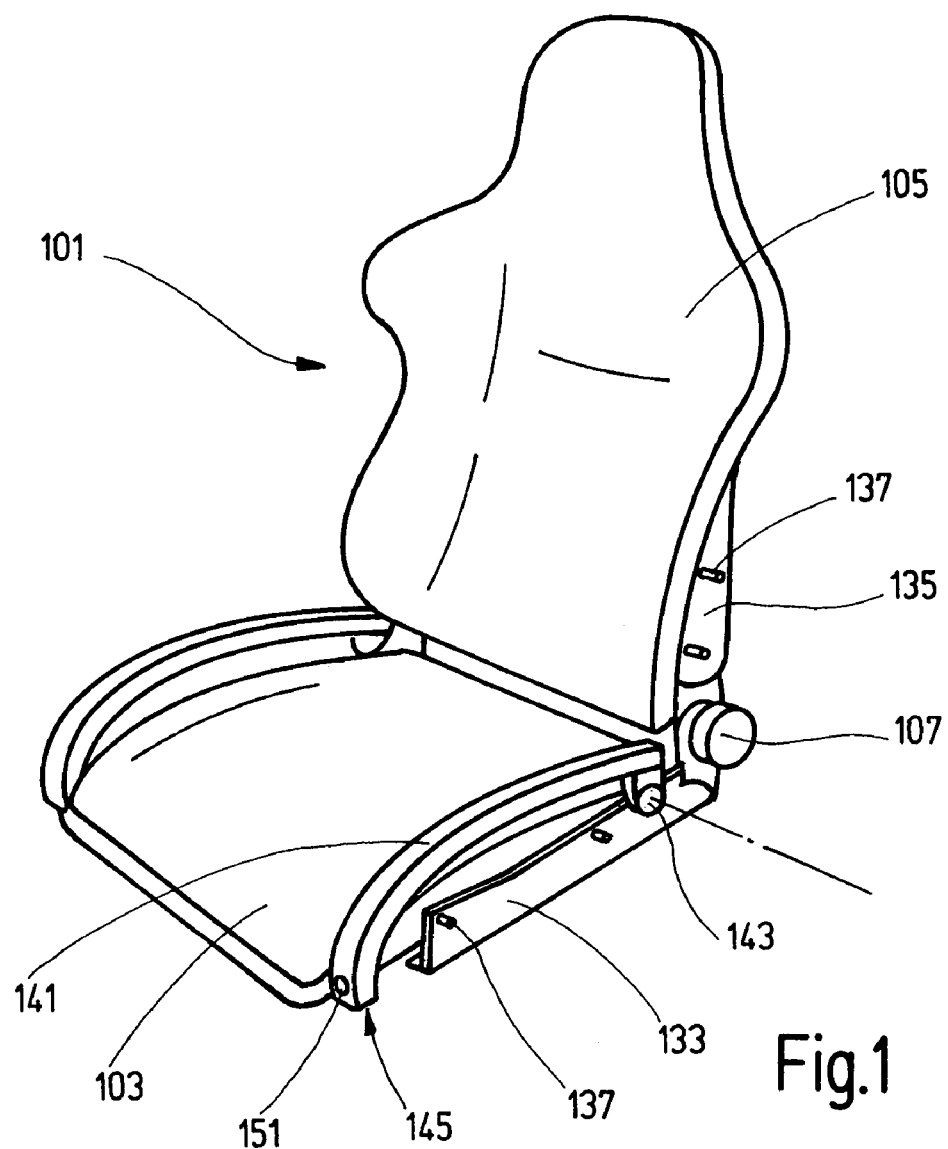
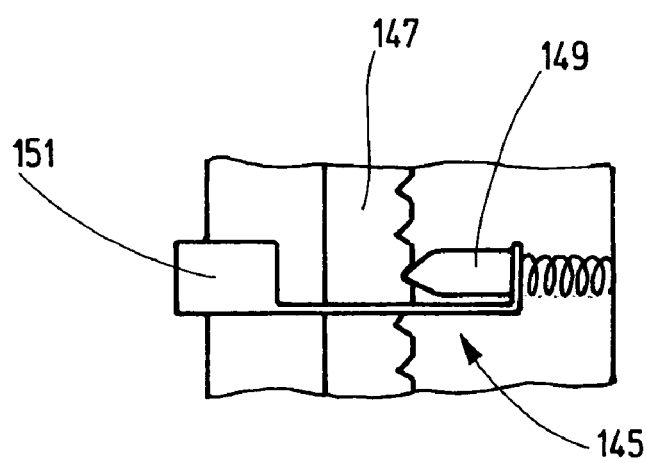

SPORTS SEAT FOR A VEHICLE, ESPECIALLY FOR A MOTOR VEHICLE

CROSS-REFERENCE TO RELATED APPLICATION

The present application is a continuation of International Application PCT/EP2004/006404, which was filed Jun. 15, 2004. The entire disclosure of International Application PCT/EP2004/006404 is incorporated herein by reference.

BACKGROUND OF THE INVENTION

The present invention relates to a sports seat for a vehicle, especially for a motor vehicle, having at least one rigid seat shell as a structure for the seat part, and a separately formed, rigid backrest shell as a structure for the backrest, with the shells being adjustable in inclination relative to each other.

DE 1 755 333 describes a known sports seat of the type described above, in which the backrest shell is coupled to the seat shell by means of an articulated connection. The adjustment of the inclination takes place by means of a spindle and a respective spindle nut on each shell. For lateral support of the occupant, the two shells are contoured. In particular, the side edges are curved upward or forward. Padding and covering are fitted directly on the shells.

BRIEF SUMMARY OF SOME ASPECTS OF THE INVENTION

The present invention is based on the object of improving a seat of the type mentioned above. In accordance with one aspect of the present invention, a seat (e.g., a sport seat) for a vehicle, especially for a motor vehicle, has at least one rigid seat shell as a structure for the seat part, and a separately formed, rigid backrest shell as a structure for the backrest. An inclination adjustment takes place by way of fittings. Each fitting has a lower part that is fixedly connected to the seat shell, and an upper part that is connected to the backrest shell. The upper part of the fitting can be rotated relative to the lower part of the fitting to adjust the backrest's inclination.

Because the adjustment of the inclination takes place by way of fittings, which have a lower part fixedly connected to the seat shell and an upper part which is connected to the backrest shell and can be rotated relative to the lower part, i.e. takes place with backrest inclination adjustment fittings as are known in the case of vehicle seats having frame structures, the advantages of a simple, lightweight and sporty construction are combined with the advantages of a comfortable adjustment of the inclination of the backrest in order to adapt the inclination of the backrest to the sitting position of the user. In addition, standardized series products can be used as the fittings, which saves tool costs. The full functionality of the fittings is available, for example even a free-pivoting function. In the case of the sports seat mentioned in the above Background section, such a free-pivoting function requires a particular solution that is disclosed in DE 2 001 842. By combining the seat of the present invention with moveable seat rails, the longitudinal position of the seat can also be optimized, which increases the comfort.

For simple installation of the standardized fittings, two adapters are preferably fitted to each fitting and are in turn fastened in each case to one of the two shells. The regions in which the adapters are fastened to the shells are preferably reinforced, so that, on the one hand, they can absorb the necessary forces and, on the other hand, the risk of the shells beginning to break is banished. The adapter which is fastened to the seat shell can serve at the same time as a substructure, i.e. it has elbows, feet or the like, which reduces the number of necessary components and the outlay on installation.

The seat shell can have, at least on the sill side (e.g., the side of the seat next to a door of the vehicle), a moveable side cheek bow. The side cheek bow is raised with respect to the central portion of the length of the seat shell to laterally grip the occupant, and it is lowered for entry and exit purposes. As a result, the shape of the sports seat can be briefly changed to provide more comfortable entry and exit without the sporty driving sensation and the lateral grip during rapid cornering being impaired. This is of advantage in particular in the case of lowered motor vehicles. Moveable side cheeks of this type are otherwise known only in the case of vehicle seats having frame structures, for example from DE 31 51 018 A1 or DE 32 16 060 A1. The moveable side cheek bow could also be provided in the case of a single-part shell seat.

It is to be understood that the shape of the side cheek bow could be planar. The side cheek bow may be coupled, for example, to the seat shell or to an adapter fastened to the seat shell, which ensures a defined movement. At the free end, the movement is then guided in the circumferential direction, approximately in the tangential direction. In order to be able to lower the side cheek bow as low as possible in the leg region, it is preferably coupled at its end which is at the rear in the direction of travel, for example in the region of the fitting, and is mounted displaceably at its front end. As an alternative, the side cheek bow may be fitted in a linearly displaceable manner to the seat shell, or to an adapter fastened to the seat shell, or to a substructure supporting the seat shell, as a result of which uniform lowering and raising over the length of the seat are achieved. The guidance can take place, for example, by means of two parallel columns which at the same time support the side cheek bow. In both cases, a latching mechanism is preferably provided which releasably locks the side cheek bow relative to the seat shell and can be released by an easily accessible operating element. The locking may also take place in a different manner known per se.

Other aspects and advantages of the present invention will become apparent from the following.

BRIEF DESCRIPTION OF THE DRAWINGS

The present invention is explained in greater detail below with reference to exemplary embodiments which are illustrated in the drawings, in which:

FIG. 1 shows a perspective view of the structure of the first exemplary embodiment obliquely from the front, FIG. 2 shows a schematized section through a latching mechanism.

DETAILED DESCRIPTION OF EXEMPLARY EMBODIMENTS

In the first exemplary embodiment, a sports seat 101, which is designed as a shell seat, has a single-piece, contoured (i.e. provided with integrally formed, angled regions), rigid seat shell 103 as a structure for the seat part, and a separately formed, likewise single-piece, highly contoured, rigid backrest shell 105 as a structure for the backrest. The backrest shell 105 is fitted to the seat shell 103 in a manner such that it can be adjusted in inclination by means of fittings 107. The seat shell 103 and the backrest shell 105 are manufactured from a material which is known per se, for example from a glass fiber material, a carbon fiber material or a plastic material, which is reinforced with mats of glass fibers or carbon fibers. The seat shell 103 and the backrest shell 105 are padded in a manner known per se with foam and a covering, for example of leather.

Figure 3:
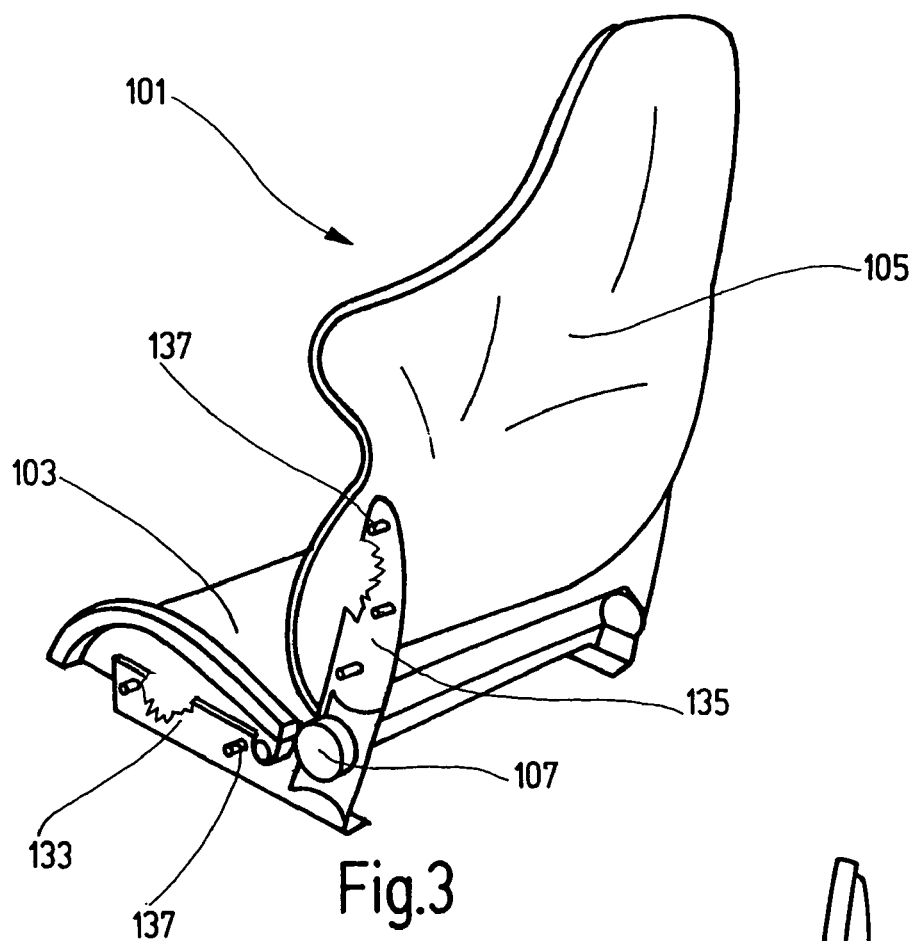
FIG. 3 shows a perspective view of the structure of the first exemplary embodiment obliquely from the rear.
Figure 4:
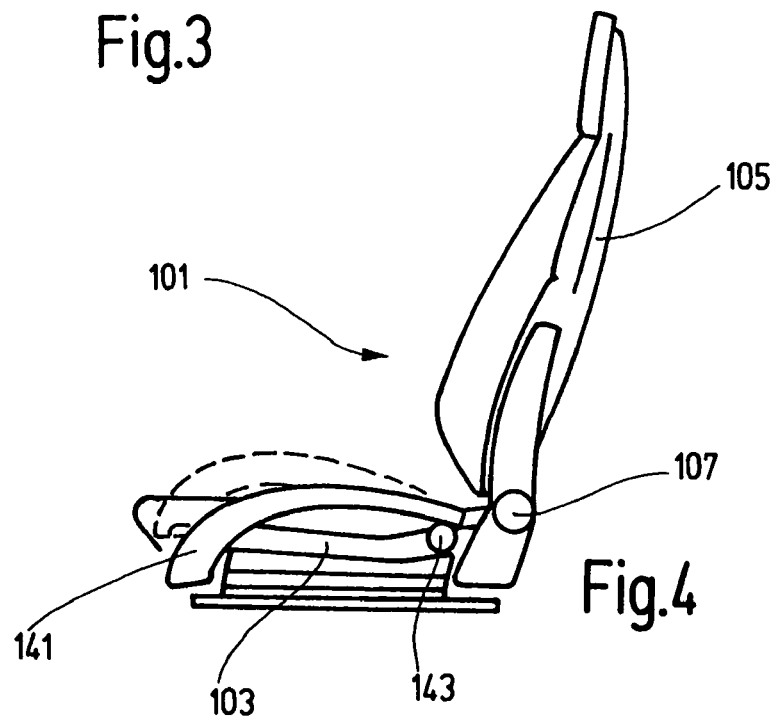
FIG. 4 shows a side view of the padded first exemplary embodiment with a lowered side cheek bow, and the side cheek bow is illustrated in its raised position by dashed lines.
Figures 5, 6:
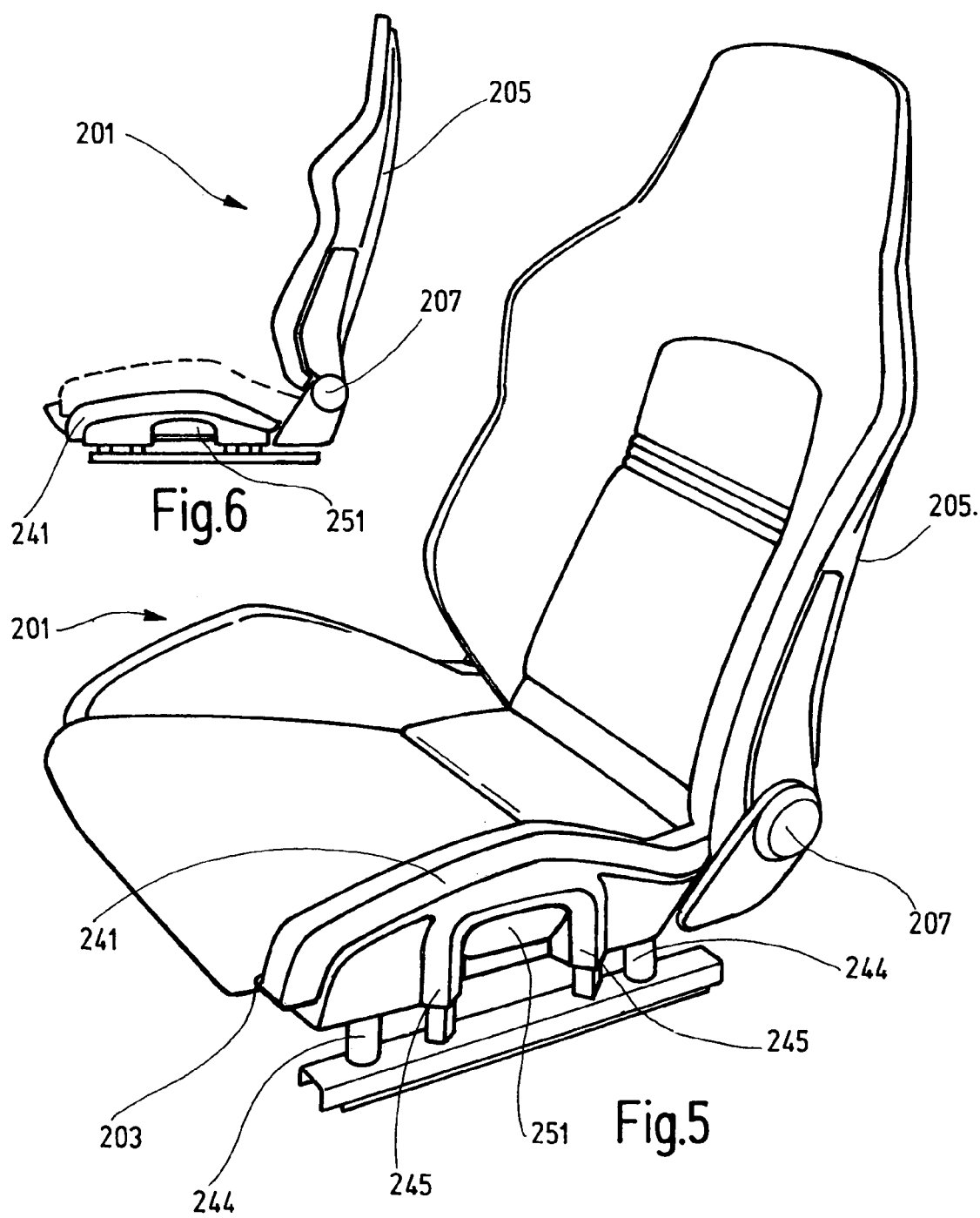
FIG. 5 shows a perspective view of the second exemplary embodiment obliquely from the front.
FIG. 6 shows a side view of the second exemplary embodiment with a lowered side cheek bow, and the side cheek bow is illustrated in its raised position by dashed lines.

The fittings 107 have lower parts and upper parts which are in each case rotatable relative to one another. In order to fasten the fittings 107, the side parts of the seat shell 103 and of the backrest shell 105 are of flat design in some regions and designed for absorbing force, i.e. for example, are reinforced and/or provided with beads or the like. In addition, in order to avoid the formation of cracks in the vicinity of the fastening regions, inserts of metal or hard plastic have been placed into the shell material before the pressing takes place and have then been pressed to the shell material. A seat part adapter 133, which is connected to the lower part of the fitting, and a backrest adapter 135, which is connected to the upper part of the fitting, are placed flat onto the thus reinforced side parts of the seat shell 103 and of the backrest shell 105, and are fixed by means of screws 137 or fastened in some other way. Portions of the adapters 133, 135 are schematically shown cut away in FIG. 3 so that underlying flat, reinforced regions of the shells 103, 105 are shown. The seat part adapter 133, which is of angled design on its lower side, serves at the same time as a substructure for fastening to the vehicle structure or optionally to the upper rail of a pair of seat rails. In the completed padded sport seat 101, the two adapters 133 and 135 are covered by plastic covers.

The side cheeks are integrally formed on the backrest shell 105. On the other hand, in the case of the seat shell 103, the structure of the side cheek is defined by a side cheek bow 141. At least the side cheek bow 141 on the sill side is coupled at its rear end to the seat shell 103 by means of a joint 143 for pivoting about a horizontal axis. At the front end, the side cheek bow 141 is releasably locked by means of a latching mechanism 145. The latching mechanism 145 comprises a latching strip 147 fixed on the seat shell and a latching bolt 149. The latching bolt 149 is mounted in a spring-loaded manner in the side cheek bow 141 and can be lifted out by a push-button-like actuating element 151. For an easier exit, the occupant can release the latching mechanism 145 by pressing on the actuating element 151 and can pivot the side cheek bow 141, which can then be changed in height, downwards until the lowered side cheek bow 141 comes to lie largely below the central portion of the length of the padded seat shell 103. Conversely, after the easier entry, the occupant can pivot the side cheek bow 141 into the uppermost position, in which it is raised with respect to the central portion of the length of the seat shell 103, in order to obtain the maximum lateral grip by the raised side cheek bow 141 during the journey.

The second exemplary embodiment is identical to the first exemplary embodiment unless described differently, for which reason identical components and components acting in an identical manner bear reference numbers incremented by 100. Also in the case of this sports seat 201, the seat shell 203 and the backrest shell 205 are connected to each other in an articulated manner by means of fittings 207 in the same way as in the previous exemplary embodiment. The sill-side side cheek bow 241 is now mounted in a linearly displaceably manner by sitting on two vertical columns 244 and being locked by two latching mechanisms 245 of the type described in the first exemplary embodiment, the two latching mechanisms 245 being coupled by a common actuating element 251. The columns 244 in turn are fitted to a substructure which supports the seat shell 203. The actuating element 251 is preferably designed as a handle and arranged in the center of the symmetrically designed side cheek bow 241, so that the occupant, with the release of the latching mechanism 245, can at the same time undertake the displacement of the side cheek bow 241.

It will be understood by those skilled in the art that while the present invention has been discussed above with reference to exemplary embodiments, various additions, modifications and changes can be made thereto without departing from the spirit and scope of the invention as set forth in the following claims.

What is claimed is:
1. A vehicle seat that is for being sat in by an occupant, the vehicle seat comprising:
   a seat part comprising at least one rigid seat shell;
   a backrest comprising a rigid backrest shell, wherein the backrest shell is formed separately from the seat shell;
   at least one fitting including a lower part and an upper part, wherein
      (a) the fitting's lower part is fixedly connected to the seat shell,
      (b) the fitting's upper part is connected to the backrest shell, and
      (c) the fitting's upper part can be rotated relative to the fitting's lower part so that the backrest's inclination can be adjusted; and
   a first adapter and a second adapter, wherein
      (a) the fitting's lower part being fixedly connected to the seat shell comprises
         (1) the first adapter being fastened to the fitting's lower part, and
         (2) the first adapter being fastened to the seat shell, and
      (b) the fitting's upper part being connected to the backrest shell comprises
         (1) the second adapter being fastened to the fitting's upper part, and
         (2) the second adapter being fastened to the backrest shell,
   wherein
      (a) the backrest shell includes a flat region,
      (b) the second adapter being fastened to the backrest shell comprises the second adapter being fastened to the flat region of the backrest shell, and
      (c) the backrest shell is a single piece that is contoured so that the backrest shell includes at least
         (1) an upper pair of side cheeks that are integral parts of the backrest shell and extend outwardly at respective opposite sides of the backrest shell, and
         (2) a lower pair of side cheeks that are integral parts of the backrest shell and extend outwardly at the respective opposite sides of the backrest shell.

2. The vehicle seat as claimed in claim 1, wherein:

the seat shell includes a reinforced region;

the first adapter being fastened to the seat shell comprises the first adapter being fastened to the reinforced region of the seat shell;

the backrest shell includes a reinforced region; and the second adapter being fastened to the backrest shell comprises the second adapter being fastened to the reinforced region of the backrest shell.

3. The vehicle seat as claimed in claim 2, wherein:

the reinforced region of the seat shell was reinforced before the first adapter was fastened to the reinforced region of the seat shell; and the reinforced region of the backrest shell was reinforced before the second adapter was fastened to the reinforced region of the backrest shell.

4. The vehicle seat as claimed in claim 2, wherein the first adapter, which is fastened to the seat shell, also is a substructure of the vehicle seat.

5. The vehicle seat as claimed in claim 1, wherein:

the seat shell includes a flat region; and the first adapter being fastened to the seat shell comprises the first adapter being fastened to the flat region of the seat shell.

6. The vehicle seat as claimed in claim 5, wherein:

the flat region of the seat shell was reinforced before the first adapter was fastened to the flat region of the seat shell; and the flat region of the backrest shell was reinforced before the second adapter was fastened to the flat region of the backrest shell.

7. The vehicle seat as claimed in claim 5, wherein the first adapter, which is fastened to the seat shell, also is a substructure of the vehicle seat.

8. The vehicle seat as claimed in claim 5, wherein the flat region of the seat shell was reinforced before the first adapter was fastened to the flat region of the seat shell.

9. The vehicle seat as claimed in claim 1, wherein the first adapter, which is fastened to the seat shell, also is a substructure of the vehicle seat.

10. The vehicle seat as claimed in claim 1, further comprising at least one side cheek bow, wherein the side cheek bow is proximate a side of the seat for being movable between:

a raised configuration in which at least a portion of the side cheek bow is higher than at least a central portion of the seat shell, so that at least the portion of the side cheek bow is positioned for providing lateral support to the occupant sitting in the vehicle seat; and a lowered configuration, wherein at least the portion of the side cheek bow is positioned lower in the lowered configuration than in the raised configuration, so that the lowered configuration is for easing the occupant's entry to, and exit from, the vehicle seat.

11. The vehicle seat as claimed in claim 10, wherein the side cheek bow is coupled to at least one feature selected from the group consisting of:

the seat shell, and an adapter fastened to the seat shell.

12. The vehicle seat as claimed in claim 11, wherein:

the side cheek bow includes a front end and a rear end; and the side cheek bow being coupled to the at least one feature comprises the rear end of the side cheek bow being coupled to the at least one feature in a manner so that at least the front end of the side cheek bow can be pivoted.

13. The vechicle seat as claimed in claims 12, further comprising a latching mechanism for releasably locking the front end of the side cheek bow relative to the seat shell.

14. The vehicle seat as claimed in claims 5, further comprising a latching mechanism for releasably locking the side cheek bow relative to the seat shell.

15. The vehicle seat as claimed in claim 10, wherein the side cheek bow is mounted in a linearly displaceable manner to at least one feature selected from the group consisting of:

the seat shell, an adapter fastened to the seat shell, and a substructure supporting the seat shell.

16. The vehicle seat as claimed in claim 15, wherein the side cheek bow being mounted in a linearly displaceable manner comprises:

the side cheek bow being displaceable along parallel columns.

17. The vehicle seat as claimed in claims 16, further comprising a latching mechanism for releasably locking the side cheek bow relative to the seat shell.

18. The vehicle seat as claimed in claims 15, further comprising a latching mechanism for releasably locking the side cheek bow relative to the seat shell.

19. The vehicle seat as claimed in claims 10, further comprising a latching mchanism for releasably locking the side cheek bow relative to the seat shell.

20. The vehicle seat as claimed in claim 1, wherein:

the first adapter is flat on the seat shell; and the second adapter is flat on the backrest shell.

21. The vehicle seat as claimed in claim 20, wherein the first adapter also is a substructure of the vehicle seat.

22. The vehicle seat as claimed in claim 20, wherein a lower portion of the first adapter is angled.

23. The vehicle seat as claimed in claim 1, wherein the backrest shell further includes a headrest that:

is an integral part of the backrest shell, is located at an upper end of the backrest shell, and extends upwardly.

24. The vehicle seat as claimed in claim 1, wherein the flat region of the backrest shell was reinforced before the second adapter was fastened to the flat region of the backrest shell.

25. The vehicle seat as claimed in claim 1, wherein the upper pair of side cheeks is shaped differently than the lower pair of side cheeks.

* * * * *